Sept. 9, 1969　　　　　　P. PENSA　　　　　　3,465,904
ADJUSTABLE BOOM FOR MATERIAL HANDLING EQUIPMENT
Filed Nov. 13, 1967　　　　　　　　　　　10 Sheets-Sheet 3
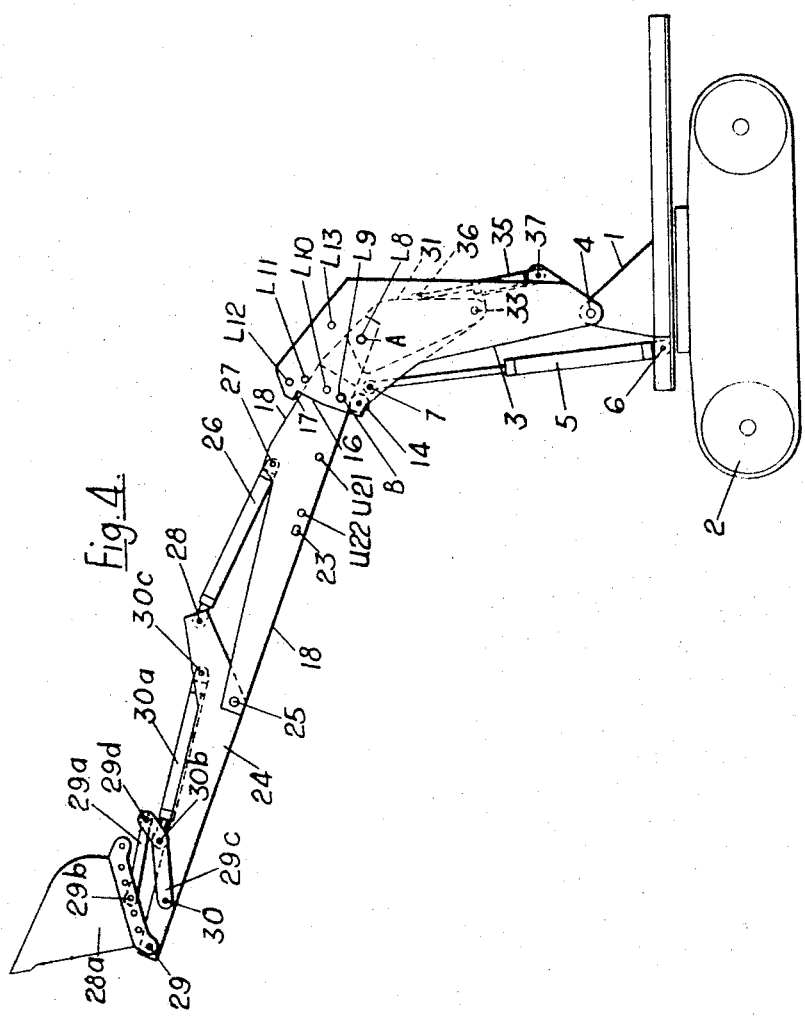
Inventor
PIETRO PENSA
By Tweedale & Gerhardt
Attorneys

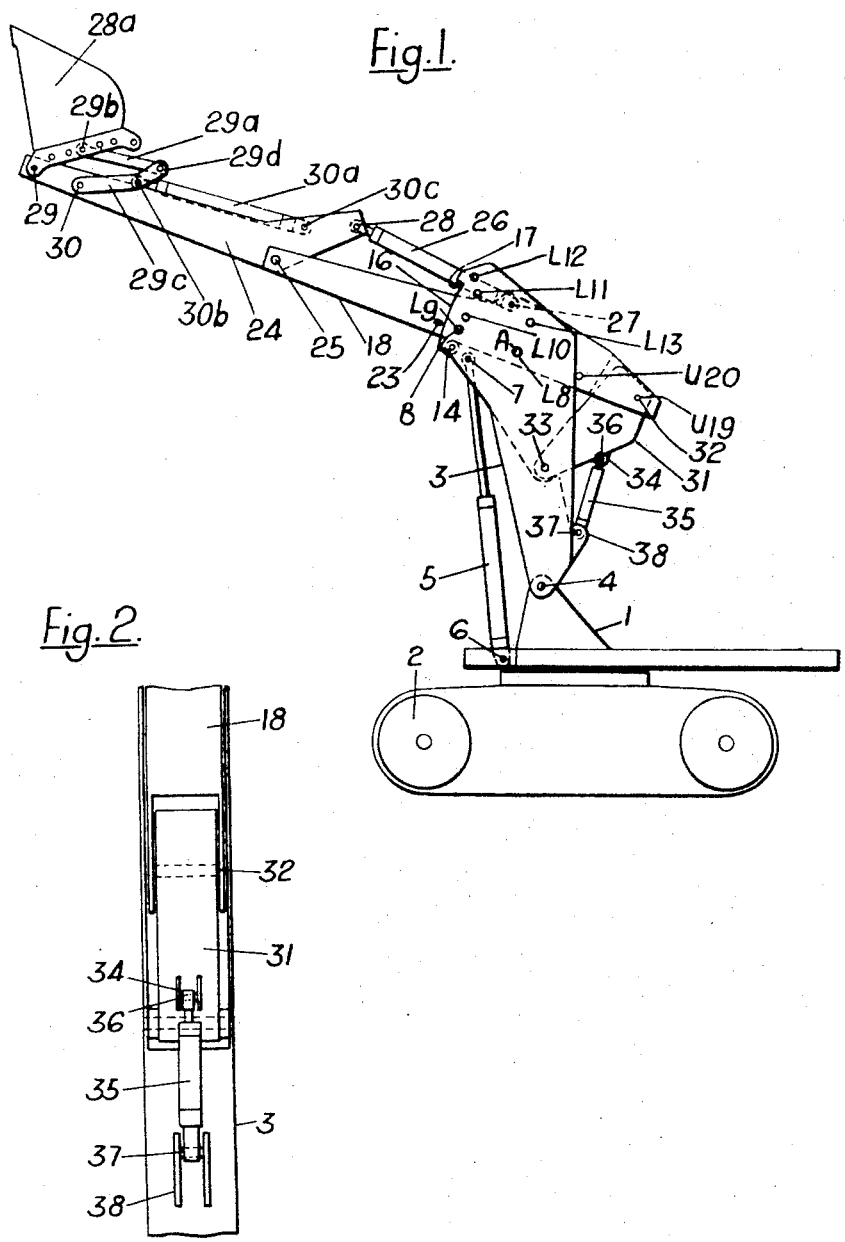

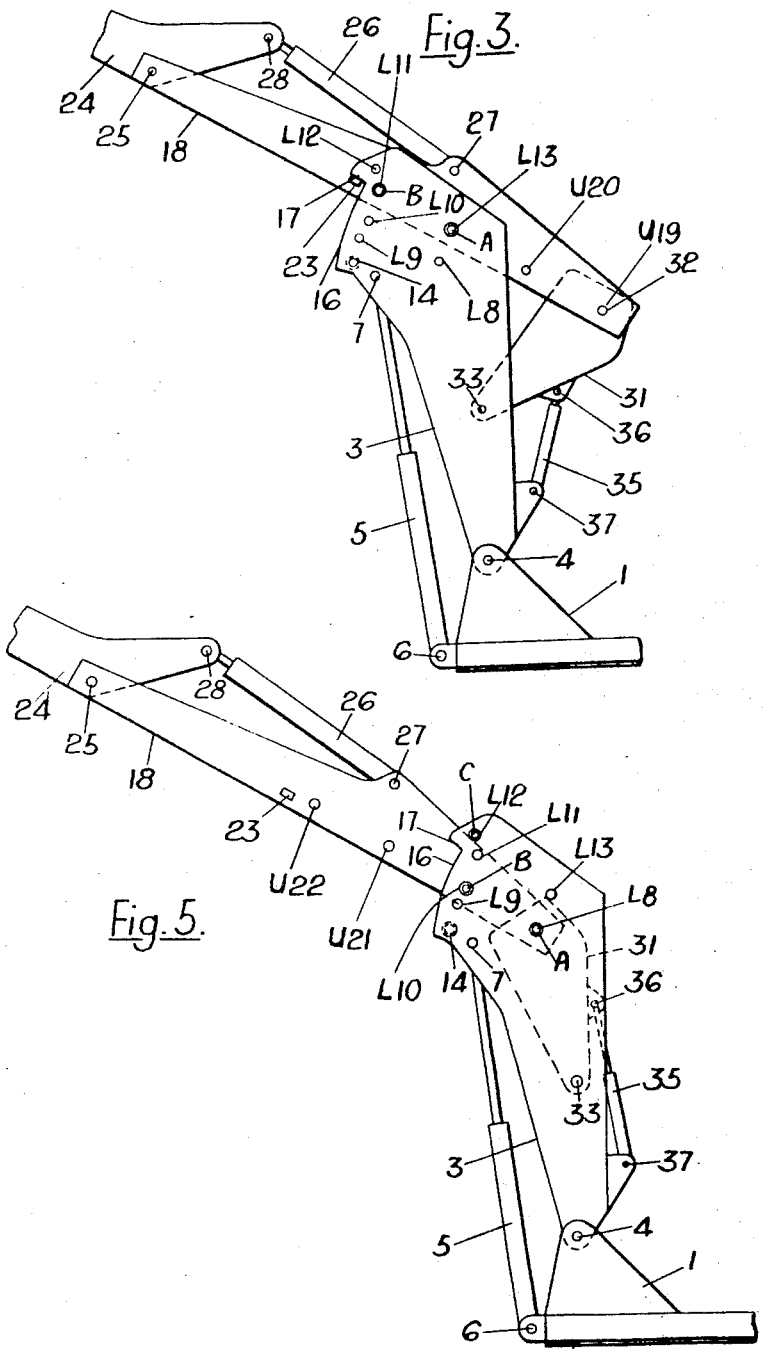

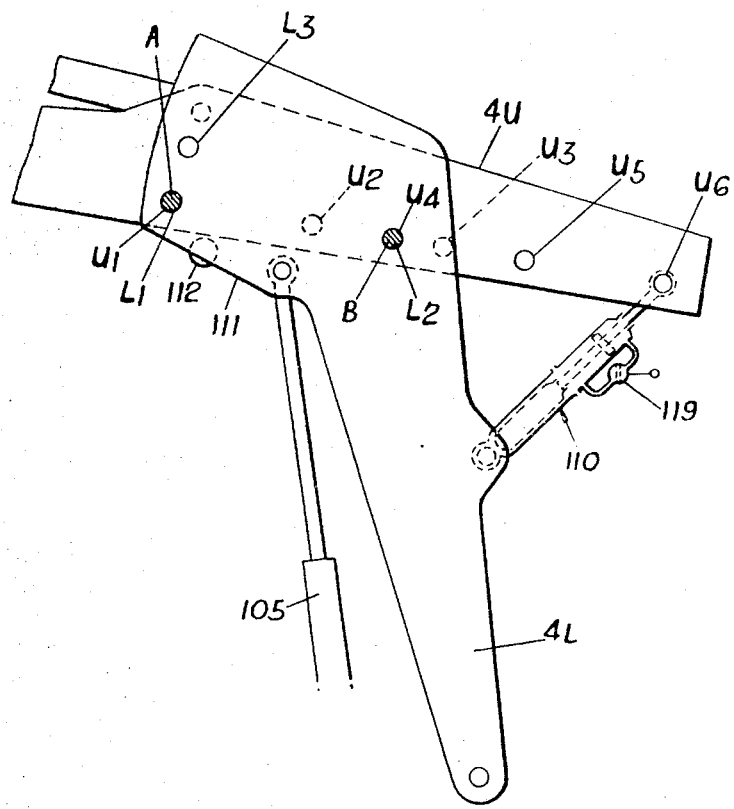

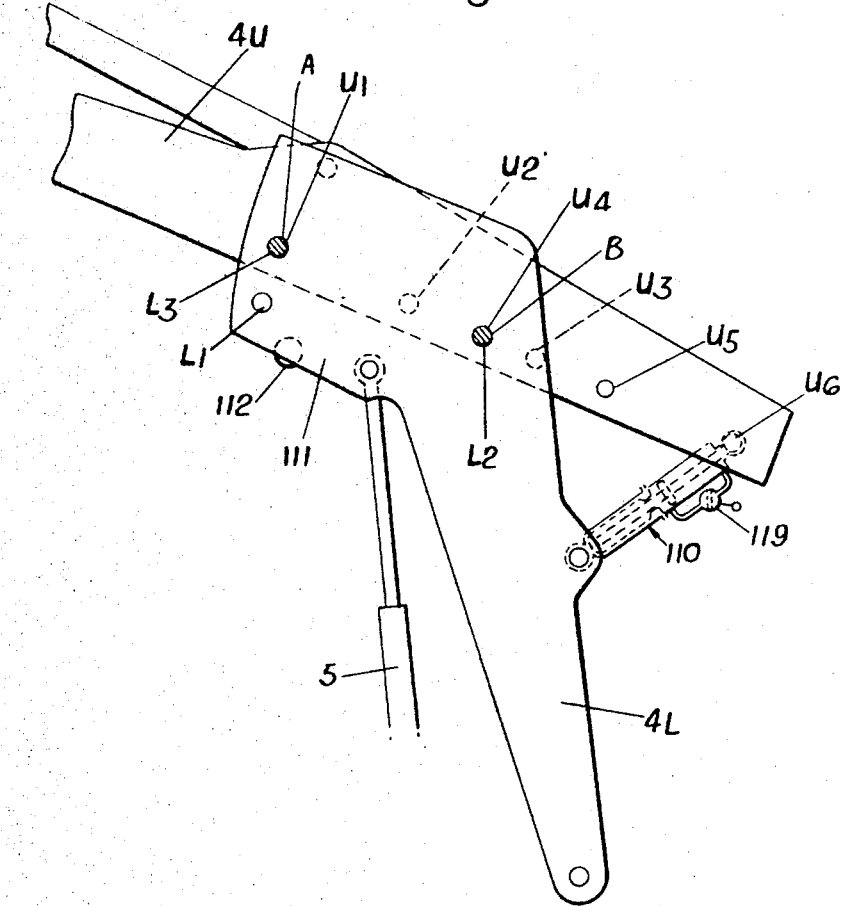

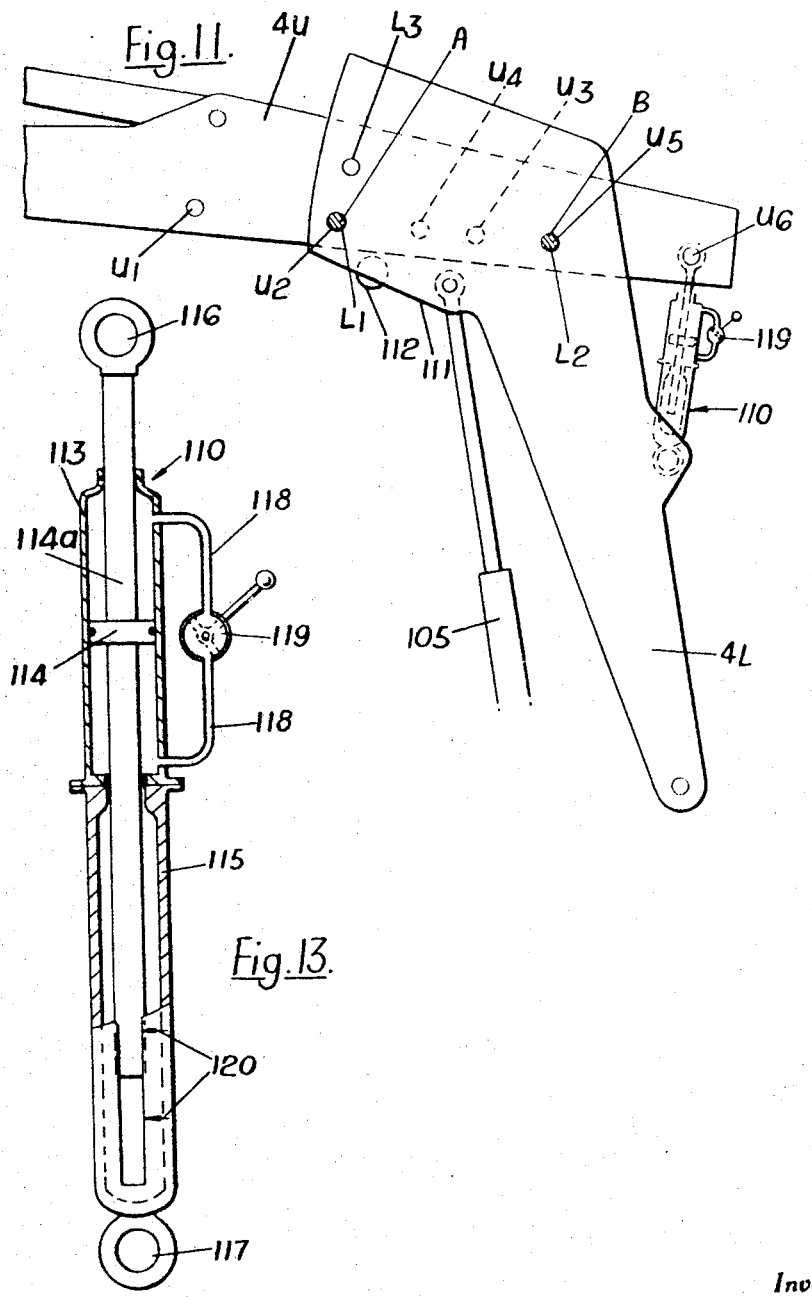

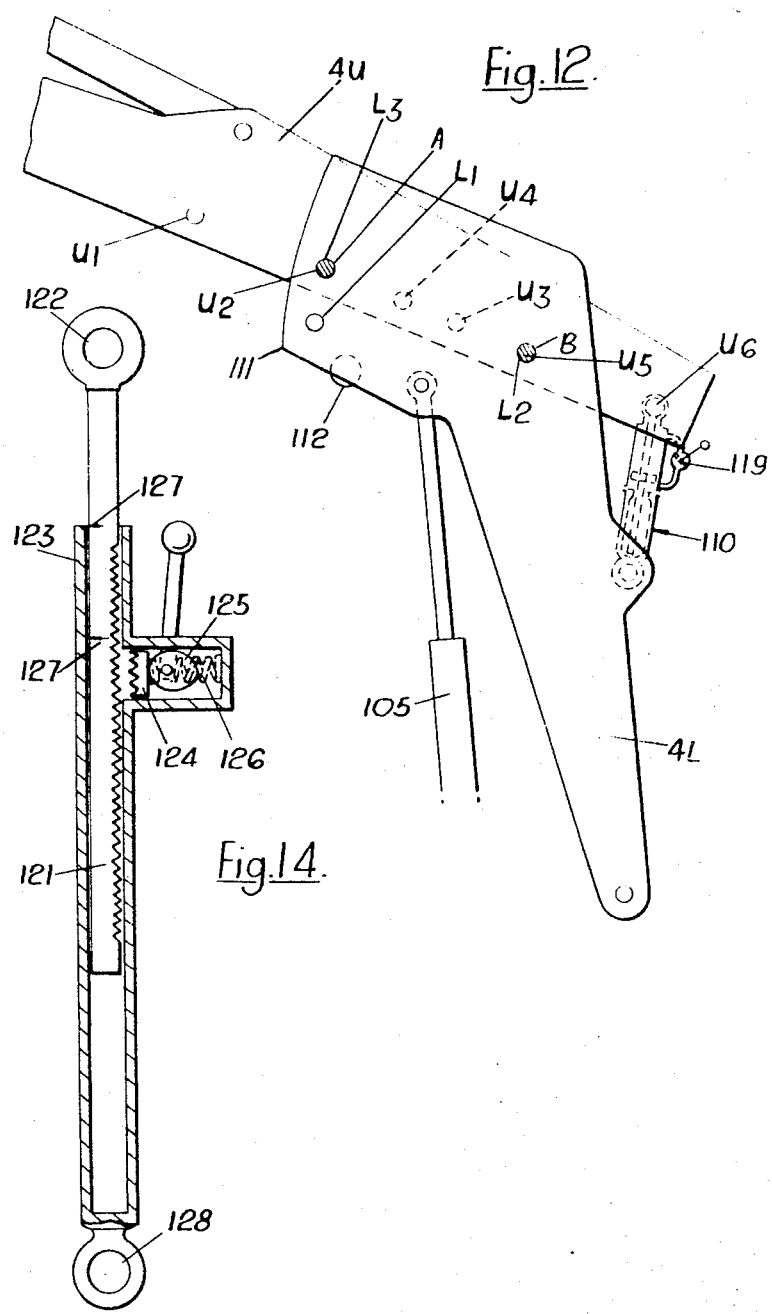

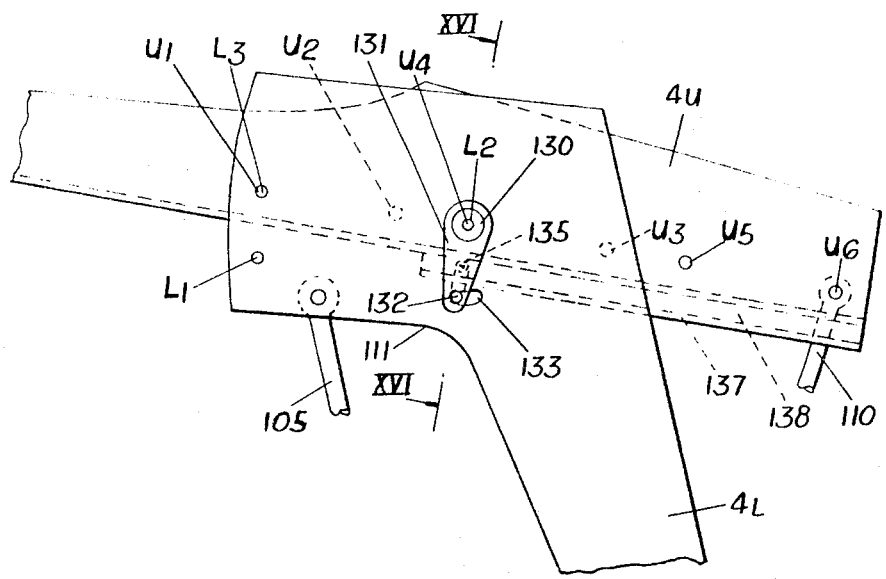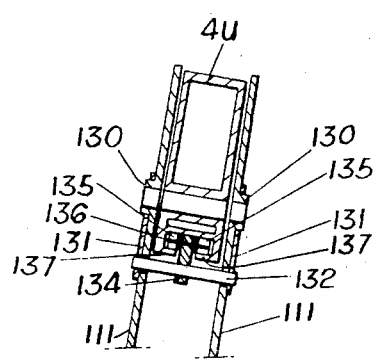

United States Patent Office 3,465,904
Patented Sept. 9, 1969

3,465,904
ADJUSTABLE BOOM FOR MATERIAL HANDLING EQUIPMENT
Pietro Pensa, Milan, Italy, assignor to Massey-Ferguson Services N.V., Curacao, Netherlands Antilles
Filed Nov. 13, 1967, Ser. No. 682,253
Claims priority, application Italy, Nov. 18, 1966, 30,143A/66; Sept. 8, 1967, 20,292A/67
Int. Cl. E02f 3/00
U.S. Cl. 214—138                    16 Claims

ABSTRACT OF THE DISCLOSURE

A material handling device having a multi-element boom assembly with interconnecting means between the elements for providing a plurality of operative configurations of the boom assembly with power means for adjusting the relative positions of the elements so as to change the configuration. Power means are provided to move the elements relative to each other to change configuration and locking means hold the elements in fixed relationship during operation.

---

This invention relates to material handling devices which include a pivotable boom and especially to such devices in which the versatility of the device is enhanced by the provision of a boom of selectively variable length.

The invention is especially applicable to excavators having a boom mounted for pivotal movement in elevation and in slewing, a dipper member pivotably mounted for movement in a vertical plane on the free end of the boom, and a bucket or grab pivotally mounted for movement in a vertical plane on the free end of the dipper member.

Excavators having booms formed in two pieces and in which the two pieces are mutually secured in two alternative positions are known. It is a disadvantage of some such excavators that the two pieces being very heavy are not easily maneuvered into a new position for attachment when it is desired to change the configuration of the boom. Usually it is necessary for two men to carry out the change, one being at the excavator controls, and the other signalling to the former the movements required. The circumstances are made worse if a degree of relative angular movement as well as a relative linear movement is necessary to accomplish the desired relative change of position. Further, the degree of control over the boom movements may be jerky and even with two men in attendance it may take some time to bring about the desired position change.

An object of the present invention is to mitigate the above disadvantages and to permit one man alone to alter the configuration of the boom without undue expenditure of time.

According to the present invention there is provided a material handling device comprising a support base, a boom mounted on said base for pivotal movement in elevation, elevating means for elevating said boom, an implement supported by said boom, said boom comprising a first boom member and a second boom member mutually rigidly attachable, by locking means, in a plurality of positions and a link pivotally connected at one end of the first boom member and at the other to the second boom member, a guide member on the first boom member operable in cooperation with said link to support and guide said second boom member in its relative movement between said positions.

Conveniently the device may include co-operable stop means as the boom members for aid in mutual location of the members in the said positions.

The guide member may be a roller on which the second boom member can run and in one form of the invention the stop means mentioned above includes a pin-and-slot arrangement permitting limited relation angular movement between the boom members about the axis of the roller.

The link may be rigid and movable relative to the first boom member by means of a jack pivotally connected at opposite ends respectively to the link and the first boom member. Alternatively, the link may be length-adjustable and lockable in a plurality of different effective lengths.

Embodiments of the invention will now be described by way of example, with reference to the accompanying drawings, in which:

FIGURE 1 is a side view of an excavator according to the invention in one configuration;

FIGURE 2 is an end view to an enlarged scale of a detail of the excavator;

FIGURES 3, 4 and 5 are views similar to FIGURE 1 showing three other configurations respectively of the excavator;

FIGURES 7 to 12 show to an enlarged scale the boom of the excavator of FIGURE 6 in six configurations respectively;

FIGURE 13 is an enlarged longitudinal cross-section of a hydraulically lockable, length adjustable link;

FIGURE 14 is an enlarged longitudinal cross-section of a mechanically lockable, length adjustable link;

FIGURE 15 is an enlarged side view of a modified roller assembly, and

FIGURE 16 is a cross-section on line XVI—XVI of FIGURE 15.

Figure 6:
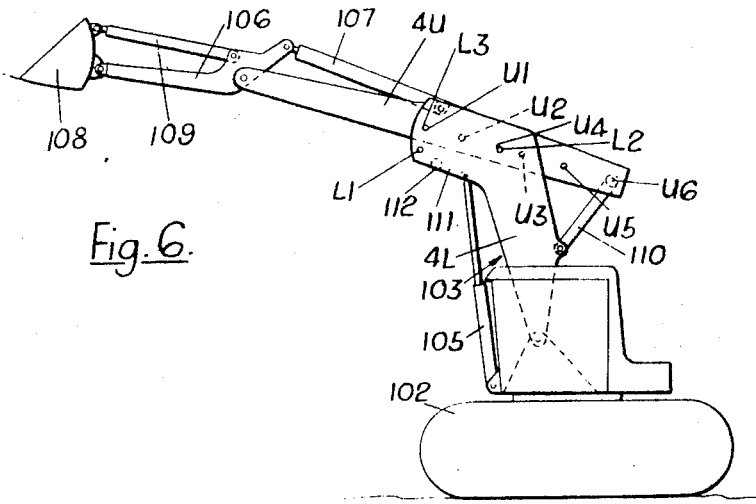
FIGURE 6 shows a side view of a modified excavator according to the invention.

In FIGURES 1 to 5 a support base 1 is mounted for swivelling movement about a vertical axis on a chassis 2 having driving tracks. A first or lower boom 3 is mounted at its lower end for angular elevational movement about a horizontal pivot 4, and a boom ram 5 is pivotally connected at its lower end by a pivot 6 to the base 1 and at its upper end by a pivot 7 to the lower boom 3. The lower boom 3 is bifurcated at its upper end and is provided with through holes L8, L9, L10, L11, L12 and L13, and with a support and guide roller 14 rotatable about a horizontal transverse axis. At its upper forward extremity, the lower boom 3 is provided with an arcuate stop 16, and at the upper end of the latter there is a further stop 17.

A second or upper boom 18 is rigidly securable to the lower boom in one of four different positions, and is provided with four holes U19 and U20 (FIGURE 1) and U21 and U22 (FIGURE 4) and with a stop 23 which is adapted to cooperate with the stops 16 and 17 in circumstances to be described. A dipper stick 24 is pivotable on the free end of the upper boom 18 on pivot 25, and a dipper ram 26 extends from a pivot 27 on the upper boom 18 to a pivot 28 on the dipper stick 24. A tool such as a bucket 28a is attached to the free end of the dipper stick at a pivot point 29 and a lever 29a is pivoted to the grab at one 29b of a number of selected points thereon. A further lever 29c is articulated between the lever 29a and the dipper stick 24 respectively at pivots 29d and 30. A ram 30a is articulated between the lever 29c and the dipper stick 24 respectively at pivots 30b and 30c. The upper boom 18 is bifurcated at its rear end and receives a third boom portion or link 31 between the bifurcations.

The link 31 is permanently pivoted to the rear end of the upper boom by a pivot 32 and to the lower boom 3 intermediate its ends by a pivot 33. The pivot 32 is a hollow pivot pin which is capable of receiving a solid pivot pin through its center. Intermediate the ends of the link 31 on its rearward and downwardly presented face, as seen in FIGURE 1, are lugs 34 and a double acting hydraulic telescopic jack 35 extends from a pivot 36 on the lugs 34 to a pivot 37 on lugs 38 on the rear of the lower boom portion 3. Pins A and B are available for insertion through the various holes to secure the upper and lower booms together rigidly.

In FIGURE 1 the pin A passes through the holes L8 and U21, and the pin B passes through holes L9 and U22. The roller 14 is situated so that it positions the holes L9 and U22 in substantial alignment.

The conversion of the boom from one configuration to another will now be described in terms of the action required by the operator.

Conversion from the FIGURE 1 to FIGURE 4 configuration entails the following steps:

(a) Contracting the jack 35 until the upper boom is supported on pin A, but not on pin B.

(b) Removing the pin B.

(c) Extending jack 35 initially until the upper boom rests on roller 14 and subsequently until pin A no longer supports the upper boom.

(d) Removing the pin A.

(e) Extending jack 35 and causing link 31 to push the upper boom 18 forward across the roller 14 until the hole U19 in the hollow pivot 32 lies in alignment with hole L8, the geometry of the structure being such as to permit this.

(f) Inserting the pin A in aligned holes L8 and U19.

(g) Contracting the jack 35 if necessary so that the holes L9 and U20 are in alignment.

(h) Inserting the pin B in the aligned holes L9 and U20.

(i) Releasing pressure in the ram 35.

In making the reverse conversion it is simply necessary to reverse the above procedure, the only difference being that the stops 23 on the upper boom and the arcuate stop 16 on the lower boom cooperate to locate the holes L8 and U21 in alignment.

In moving the upper boom 18 between the configurations of FIGURES 1 and 4, it will be seen that the stops 16 and 23 and the roller 14 permit an operator to follow a procedure which will lead with certainty and safety to the securing of the upper and lower booms together in the new configuration.

Conversion from the FIGURE 1 to FIGURE 3 configuration entails the following steps:

(a) to (d) as above.

(j) Contracting the boom ram 5 initially until the tool rests on the ground, and subsequently until the lower boom 3 falls away from under the upper boom 18, and the stop 23 moves arcuately along stop 16 until it hits stop 17, the hole L11 then being in alignment with hole U22.

(k) Inserting the pin B into the aligned holes L11 and U22.

(l) Contracting the jack 35 slightly, if necessary, so that the holes L13 and U21 are in alignment.

(m) Inserting the pin A in the aligned holes L13 and U21.

(i) Releasing pressure in ram 35.

The procedure is reversed to reconvert the boom from the configuration of FIGURE 3 to FIGURE 1, the limit stop in this case being roller 14.

The configuration of FIGURE 5 is achieved from that of FIGURE 4 by the following steps:

(n) Inserting a pin C in the hole L12 to form a temporary stop.

(o) Energizing the jack 35 so that the pivot 32 will not subsequently move.

(p) Contracting the boom ram 5 initially until the tool rests on the ground and the pin B is unloaded.

(q) Withdrawing the pin B.

(r) Contracting the boom 5 further until the lower boom 3 swings down to a position relative to the upper boom 18 and the top surface of the latter is in abutment with the pin C, in which position the holes L10 and U20 will be in alignment.

(s) Inserting the pin B in the aligned holes L10 and U20.

(t) Withdrawing the pin C for safe-keeping.

(i) Releasing pressure in jack 35.

As before, the reverse movement is accomplished by reversing the order of the steps.

Though the jack 35 is not active in effecting body movement of the boom movements involving configurations 3 and 5, nevertheless, it does perform the very important function of holding one end of the upper boom 18 steady while relative angular displacement of the latter takes place.

In changing the configuration from FIGURE 3 and FIGURE 5 with the boom arrangement illustrated it is preferable, though not necessary, to move successively through the configurations shown in FIGURES 1 and 4. Alternatively, the procedure in changing from FIGURE 3 to FIGURE 5 would be according to the following steps:

(u) Contracting the boom 5 until the tool rests on the ground.

(v) Withdrawing both the pins A and B.

(w) Extending the jack 35.

(x) Extending the boom ram 5 if necessary until the hole L12 is free.

(y) Inserting the pin C in the hole L12.

Carrying out steps (r) to (i).

It will be clear from the foregoing that it is within the capability of one man alone to change the configuration of the boom without danger to himself, without damaging the machine and without undue loss of time.

The stops 23, 17, pin C and roller 14 are shown as non-adjustable stops. However, they could easily be made as adjustable stops. The jack 35 is shown as a hydraulic jack but it could equally well be a mechanical jack of known type.

In FIGURES 6 to 13 an excavator has a support base 101 mounted for swivelling movement about a vertical axis on a chassis 102 having driving tracks. A boom 103 is carried by the support base 101 and is formed of a first or lower boom member 4L and a a second or upper boom member 4U. The lower boom member 4L is pivotally connected at its lower end to the support base 101 and is raised or lowered by a hydraulic boom ram 105. The lower boom member 103 is bifurcated at its upper end and is provided with through holes L1, L2 and L3 and with a guide member in the form of a roller 112 rotatable about a horizontal transverse axis.

The second or upper boom member 4U is rigidly attachable to the lower member 4L in any one of six different positions and is provided with six holes U1 to U6. A dipper arm 106 is pivotally mounted on the forward end of the upper boom member 4U, and a dipper ram 107 regulates the position of the dipper arm 106 relative to the upper boom member 4U. An implement in the form of a bucket 108 is attached to the free end of the dipper arm 106 and is controlled by a bucket ram 109. A length adjustable strut or link 110 connects the rear end of the upper boom member 4U with the lower boom member 4L.

Figure 7:
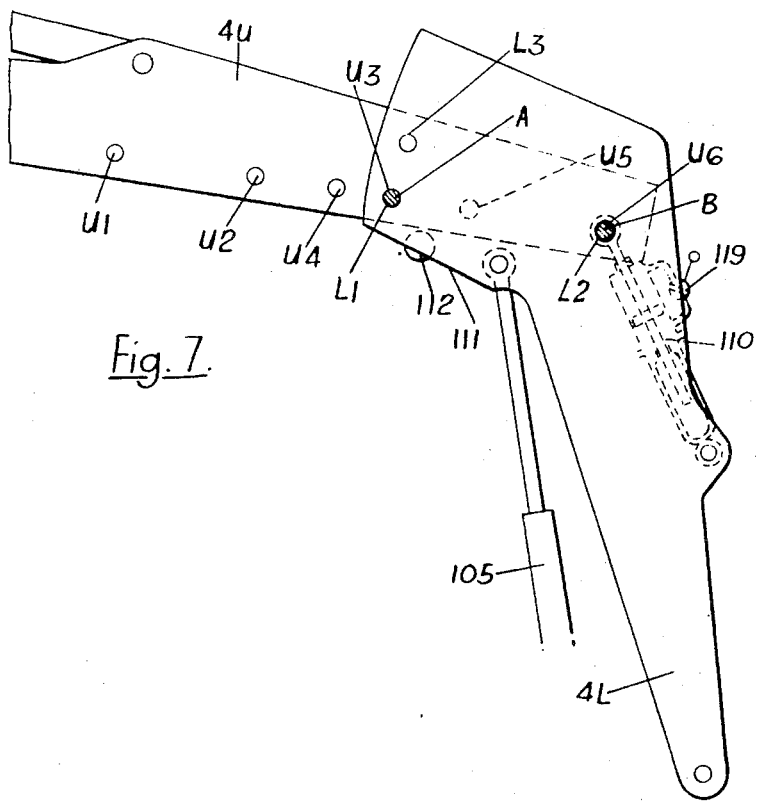

The distances between the holes L1–L2, L2–L3, U1–U4, U2–U5, U3–U6 are all the same and the upper boom member 4U lies between the side walls 111 of the bifurcated lower boom member. The roller 112 is journalled at its ends in the side walls 111 and extends between them so that the lower face of the upper boom member 4U may be supported by the roller 112. The upper boom member 4U is rigidly attached to the lower boom 4L by inserting pins A and B (FIGURE 7) through the various holes. The pins A and B cooperating with the various holes thus provide locking means. In FIGURE 7 the pin A passes through the holes L1 and U3 and the pin B passes through the holes L2 and U6.

One form of the length adjustable link 110 is shown in detail in FIGURE 13 and comprises a hydraulic cylinder 113 and a piston 114 fluid tightly slidable in the cylinder and mounted on a piston rod 114a. The piston rod 114 extends fluid tightly through both ends of the cylinder and is provided at one end with an eye 116 and has the opposite end slidably housed in an extension 115 of the cylinder 113. The extension 115 is provided at the end remote from the cylinder 113 with an eye 117. The eyes 116 and 117 are connected by pins to the upper and lower boom members 4U and 4L respectively. The opposite ends of the cylinder 113 are hydraulically connected through an external pipe 118 in which is situated an "ON/OFF" fluid switch 119. Pointers 120 are provided on the extension 115 to indicate predetermined lengths of the link 110 to the excavator operator.

The link 110 does not carry any load during working of the excavator and is provided solely to facilitate changing the relative positions of the upper and lower boom members.

Repositioning of the upper and lower boom members relative to each other will now be described in terms of the action required by the operator. Movement of the bucket to rest it on, or engage it with the ground is accomplished by use of one or more of the boom, dipper arm or bucket rams referred to hereinafter, collectively, as the "power controls."

Figure 8:
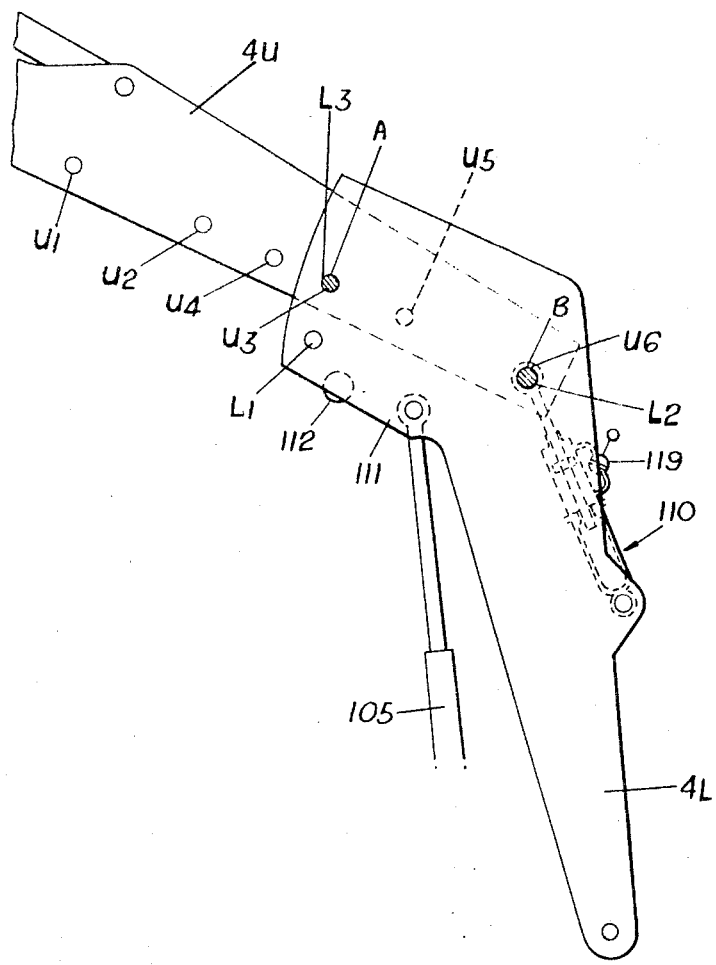

Position change from FIGURE 7 to FIGURE 8 configuration (a) Lower the bucket to the ground by means of the power controls and relieve the load on the pin A to enable it to be extracted.

(b) By use of the power controls raise the upper boom member about pin B as pivot, until the holes L3 and U3 align, and insert the pin A.

Position change from FIGURE 7 to FIGURE 9 configuration (c) Close the switch 119.

(a) Lower the bucket to the ground by means of the power controls and relieve the load on the pin A to enable it to be extracted.

(d) Relieve the load on the pin B and extract it leaving the upper boom member supported on the roller 112 and link 110.

(e) By means of the power controls move the upper and lower boom members relative to each other until the holes L1 and U1 or L2 and U4 coincide and insert the pin A or B as appropriate.

(f) Open the switch 119 and by use of the power controls align the other two holes and insert the pin A or B as appropriate.

Position change from FIGURE 9 to FIGURE 10 configuration (g) By use of the power controls relieve the load on the pin A and extract it.

(h) By use of the power controls, and with the valve 119 open, tilt the upper boom member about the pin B until the holes U1 and L3 are aligned and insert the pin A.

Position change from either FIGURE 9 or FIGURE 10 to FIGURE 11 configuration (i) By use of the power controls relieve the load on the pin A and remove it.

(j) By use of the power controls tilt the upper boom member about the pin B in a direction to shorten the link 110 to a predetermined value (determined by a stop or a visual signal).

(k) Close the switch 119 and relieve the load on the pin B by use of the power controls and remove it.

(l) Lower the upper boom member on to the roller 112 and shift it along relative to the lower boom 104 until the holes L2 and U5 align and insert the pin B.

(m) By use of the power controls, after opening the switch 119, position the holes L1 and U2 or L3 and U2 in alignment and insert the pin A.

Position change from FIGURE 11 to FIGURE 12 configuration (n) By use of the power controls relieve the load on pin A and extract it.

(o) By use of the power controls, and with the switch 119 open, tilt the upper boom member 105, about the pin B until the holes U2 and L3 are aligned and insert the pin A.

In the modification shown in FIGURE 14 the length adjustable link is mechanically lockable. A rack 121 slidable in a tube 123 has an eye 122 at one end. The tube 123 has an eye 128 at its end remote from the eye 122 and carries a locking mechanism comprising a lock 124 movable by a cam 125 into locking engagement with the rack 121. A spring 126 is provided to bias the lock 124 away from the rack 121. Pointers 127 on the rack provide an indication to the excavator operator when the link is of a predetermined length suitable for use when aligning certain of the holes in the boom members. Abutment stops may be used as an alternative to the pointers 127.

FIGURES 15 and 16 show a modified roller guide arrangement in which the roller is permitted to travel freely between limits in a circular path with the axis of the hole L2 as the center. Thus the upper boom member 4U is automatically guided toward either hole L1 or L3 as required by the geometry of the structure which is determined by the chosen length of link 110.

The lower boom member 4L is provided with bosses 130 on the outer faces of the side walls 111 and concentric with the hole L2. The bosses 130 form pivotal supports for two plates 131 which hang down from the bosses and are rigidly connected by a cross-member 132 extending through arcuate slots 133 in the side walls 111. An upstanding support 134 is fixed to the cross member 132 at its center and carries a pair of rollers 135 journalled on a cross shaft 136. The rollers 135 run in channels 138 formed by downwardly and inwardly turned portions 137 of the lower face of the upper boom member 4U. The arcuate slots 133 prevent the plates 131 from swinging through an angle greater than the angle subtended by the holes L1 and L3 at L2.

As shown in FIGURE 15, the upper and lower boom members occupy the position shown in FIGURE 10. From this position the rollers 135, running in the channels 138 will bring the holes U5 and U6 into line with the hole L2 and subsequently the holes U1, U2 or U3 can be aligned with the holes L1 or L3 as desired simply by elevating the upper boom member, with the power controls, to an angle higher than desired, locking the hydraulic link 110, and then releasing the hydraulic fluid gradually from one side of the piston to the other until the desired holes are in alignment. If necessary a remote control can be provided for the on/off switch 119 so that the operator can control the gradual fall of the upper boom member from a location at which he may easily insert the pin.

The pins A and B used for securing the upper and lower booms together are capable of being locked in their securing positions in known manner.

I claim:

1. A material handling device comprising a support base, a boom mounted on said base for pivotal movement in elevation, means for elevating said boom, an implement supported by said boom, said boom comprising a first boom member and a second boom member, guide means on the boom members, length-adjustable linkage means pivotally interconnecting the boom members and cooperable with the guide means to permit relative angular and linear movement between the boom members to a plurality of positions, and locking means for securing the boom members in each position.

2. A device according to claim 1, including co-operable stop means on the boom members for aid in mutual location of the members in the said positions.

3. A device according to claim 2, wherein the guide means comprise a roller on the first boom member and a surface on the second boom member engageable therewith.

4. A device according to claim 3, wherein the stop means includes a pin-and-slot arrangement permitting limited relative angular movement between the boom members about the axis of the roller.

5. A device according to claim 1, wherein said linkage means includes a rigid link pivotally connected at one end to said second boom member and an extendable member pivotally connected at opposite ends respectively to the link and to the first boom member.

6. A device according to claim 5 wherein the extendable member is hydraulically operable.

7. A device according to claim 1 wherein the length adjustable link is hydraulically lockable.

8. A device according to claim 7, wherein the length adjustable link comprises a piston in a cylinder in which the opposite ends of the cylinder are hydraulically connected through a valve.

9. A device according to claim 8, wherein the piston is mounted on a piston rod which passes through both ends of the cylinder.

10. A material handling device according to claim 1, wherein the length adjustable link is mechanically lockable.

11. A material handling device comprising a support base, a boom assembly mounted on said base for elevating pivotal movement, first power means for moving said boom assembly up and down relative to said base, a dipper arm pivotally connected on the end of said boom assembly, second power means for moving said dipper arm up and down relative to said boom assembly, a material handling tool pivotally mounted on the outer end of said dipper arm, third power means for pivoting said tool on said dipper arm, said boom assembly comprising a first member pivotally connected to said base, a second member adjustably carried by said first member, extendable adjusting means between said first and second members for angularly and linearly moving the members relative to each other between different positions and locking means for holding said first and second members in said different positions.

12. The material handling device of claim 11 wherein antifriction means are provided on one of said boom members for supporting the other boom member during adjustment by said extendable adjusting means.

13. The material handling device of claim 11 wherein said locking means is independent of said extendable adjusting means.

14. The material handling device of claim 13 wherein said boom members are provided with co-operable stop means for limiting the range of relative movement between the members.

15. The material handling device of claim 1 wherein said first power means extends between said base and said first boom member and said second power means extends between said second boom member and said dipper arm.

16. The material handling device of claim 11 wherein said extendable adjusting means includes a fixed link pivotally connected at opposite ends to said first and second boom members and a power extendable link pivotally connected at opposite ends to said first boom member and said fixed link.

References Cited

UNITED STATES PATENTS

| | | | |
|---|---|---|---|
| 3,249,244 | 5/1966 | Ellerbroek et al. | 214—138 |
| 3,298,548 | 1/1967 | Long et al. | 214—138 |

GERALD M. FORLENZA, Primary Examiner

U.S. Cl. X.R.

214—141

PO-1050
(5/69)

UNITED STATES PATENT OFFICE
CERTIFICATE OF CORRECTION

Patent No. 3,465,904　　　　　　　　　　Dated September 9, 1969

Inventor(s) Pietro Pensa

It is certified that error appears in the above-identified patent and that said Letters Patent are hereby corrected as shown below:

Claim 15, line 1, change "1" to --11--.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents